(12) United States Patent
Wu et al.

(10) Patent No.: US 11,734,341 B2
(45) Date of Patent: Aug. 22, 2023

(54) INFORMATION PROCESSING METHOD, RELATED DEVICE, AND COMPUTER STORAGE MEDIUM

(71) Applicant: HUAWEI TECHNOLOGIES CO., LTD., Guangdong (CN)

(72) Inventors: Huajingling Wu, Hangzhou (CN); Tingrui Han, Hangzhou (CN); Ningxi Ni, Hangzhou (CN); Lele Wang, Hangzhou (CN); Zhenli Sheng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 126 days.

(21) Appl. No.: 17/070,738

(22) Filed: Oct. 14, 2020

(65) Prior Publication Data

US 2021/0026891 A1 Jan. 28, 2021

Related U.S. Application Data

(63) Continuation of application No. PCT/CN2019/091306, filed on Jun. 14, 2019.

(30) Foreign Application Priority Data

Jun. 15, 2018 (CN) .......................... 201810627600.9

(51) Int. Cl.
 *G06F 16/00* (2019.01)
 *G06F 16/583* (2019.01)
 (Continued)

(52) U.S. Cl.
 CPC .......... *G06F 16/583* (2019.01); *G06F 16/906* (2019.01); *G06F 16/908* (2019.01);
 (Continued)

(58) Field of Classification Search
 CPC ............. G06F 16/906; G06F 16/90335; G06F 16/908; G06K 9/6232; G06N 3/04
 See application file for complete search history.

(56) References Cited

U.S. PATENT DOCUMENTS 9,980,009 B2 * 5/2018 Jiang .................... H04N 21/482
10,354,307 B2 * 7/2019 Ye ...................... H04N 21/4722
(Continued)

FOREIGN PATENT DOCUMENTS

CN 104820696 A 8/2015
CN 105512273 A 4/2016
(Continued)

OTHER PUBLICATIONS

Wengang Zhou et al., Scalable Feature Matching by Dual Cascaded Scalar Quantization for Image Retrieval, IEEE Transactions on Pattern Analysis and Machine Intelugence, vol. 38, No. 1 , Jan. 2016, 13 pages.
(Continued)

*Primary Examiner* — Daniel A Kuddus
(74) *Attorney, Agent, or Firm* — Womble Bond Dickinson (US) LLP (57) ABSTRACT

An information processing method is disclosed. The method includes: obtaining initial feature information of to-be-queried information; performing feature processing on the initial feature information of the to-be-queried information, to obtain target feature information of the to-be-queried information, where the feature processing includes at least feature dimension processing used to process a data dimension of the initial feature information of the to-be-queried information to be a preset dimension; performing a first retrieval operation on m pieces of candidate information based on the target feature information of the to-be-queried information, to obtain a first retrieval result; and performing a second retrieval operation on the first retrieval result based
(Continued)

on the initial feature information of the to-be-queried information, to obtain result information corresponding to the to-be-queried information. The method can quickly and efficiently implement information retrieval.

15 Claims, 3 Drawing Sheets

(51) Int. Cl.
    *G06F 16/906*    (2019.01)
    *G06F 16/903*    (2019.01)
    *G06F 16/908*    (2019.01)
    *G06F 18/213*    (2023.01)
    *G06N 3/04*     (2023.01)

(52) U.S. Cl.
    CPC ...... *G06F 16/90335* (2019.01); *G06F 18/213* (2023.01); *G06N 3/04* (2013.01)

(56) References Cited

U.S. PATENT DOCUMENTS

| | | | |
|---|---|---|---|
| 11,069,338 B2* | 7/2021 | Meng | G10L 15/26 |
| 11,120,078 B2* | 9/2021 | Tang | H04N 21/4826 |
| 2012/0084652 A1* | 4/2012 | Martinez Bauza | H04N 13/128 |
| | | | 348/E13.001 |
| 2013/0142439 A1 | 6/2013 | Xin et al. | |
| 2014/0343704 A1* | 11/2014 | Liu | G06F 16/683 |
| | | | 700/94 |
| 2015/0074112 A1* | 3/2015 | Liu | G06F 40/205 |
| | | | 707/739 |
| 2015/0154229 A1 | 6/2015 | An et al. | |
| 2016/0275588 A1* | 9/2016 | Ye | G06Q 30/0625 |
| 2017/0150159 A1* | 5/2017 | Lee | H04N 19/52 |
| 2017/0344542 A1* | 11/2017 | Zuo | G06F 16/438 |
| 2018/0175981 A1* | 6/2018 | Manolakos | H04L 5/0046 |
| 2018/0359069 A1* | 12/2018 | Nam | H04B 17/345 |
| 2019/0147372 A1* | 5/2019 | Luo | G06V 10/82 |
| | | | 706/20 |
| 2019/0251337 A1* | 8/2019 | Liang | G06T 7/254 |
| 2019/0261010 A1* | 8/2019 | Luo | H04N 19/176 |

FOREIGN PATENT DOCUMENTS

| | | | |
|---|---|---|---|
| CN | 105574506 A | | 5/2016 |
| CN | 106033549 A | | 10/2016 |
| CN | 106778526 A | * | 11/2016 |
| CN | 106778526 A | | 5/2017 |
| CN | 106886553 A | | 6/2017 |
| CN | 106886599 A | | 6/2017 |
| CN | 107679250 A | | 2/2018 |
| EP | 3605364 A1 | * | 5/2020 |

OTHER PUBLICATIONS

Tiezheng Ge et al. Optimized Product Quantization for Approximate Nearest Neighbor Search, 2013 IEEE Conference on Computer Vision and Pattern Recognition, pp. 2946-2953.
Kevin Lin et al. Deep Learning of Binary Hash Codes for Fast Image Retrieval, CVPR 2015. pp. 27-35.

* cited by examiner

INFORMATION PROCESSING METHOD, RELATED DEVICE, AND COMPUTER STORAGE MEDIUM

CROSS-REFERENCE TO RELATED APPLICATIONS

This application is a continuation of International Patent Application No. PCT/CN2019/091306 filed on Jun. 14, 2019, which claims priority to Chinese Patent Application No. 201810627600.9 filed on Jun. 15, 2018. The disclosures of the aforementioned applications are hereby incorporated by reference in their entireties.

TECHNICAL FIELD

This application relates to the field of internet technologies, and in particular, to an information processing method, a related device, and a computer storage medium.

BACKGROUND

With rapid development of internet technologies, social media platforms such as Renren, WeChat, and Weibo emerge, so that massive data such as images and texts can be shared. On the internet, a large amount of data needs to be transmitted and processed at any time. For example, according to statistics collected by a public security department in a city, 20,000 surveillance cameras are installed in public places, and generate about 140 billion images each year.

How to quickly and accurately retrieve, from such massive image data, image data that is queried by a user is hot research at present.

SUMMARY

Embodiments of this application disclose an information processing method, a related device, and a computer storage medium, to quickly and efficiently implement information retrieval.

According to a first aspect, an embodiment of this application provides an information processing method. The method includes:

obtaining initial feature information of to-be-queried information;

performing feature processing on the initial feature information of the to-be-queried information, to obtain target feature information of the to-be-queried information, where the feature processing includes at least feature dimension processing, and the feature dimension processing is used to process a data dimension of the initial feature information of the to-be-queried information to be a preset dimension;

performing a first retrieval operation on m pieces of candidate information based on the target feature information of the to-be-queried information, to obtain a first retrieval result, where m is a positive integer; and performing a second retrieval operation on the first retrieval result based on the initial feature information of the to-be-queried information, to obtain result information corresponding to the to-be-queried information.

In one embodiment, each piece of candidate information includes initial feature information of the candidate information and target feature information of the candidate information, and a data dimension of the target feature information of the candidate information is the same as a data dimension of the target feature information of the to-be-queried information;

the first retrieval operation includes:

retrieving target feature information of the m pieces of candidate information based on the target feature information of the to-be-queried information, to obtain the first retrieval result, where the first retrieval result includes n pieces of candidate information, and n is a positive integer less than m; and the second retrieval operation includes:

retrieving initial feature information of the n pieces of candidate information based on the initial feature information of the to-be-queried information, to obtain the result information corresponding to the to-be-queried information.

In one embodiment, the retrieving target feature information of the m pieces of candidate information based on the target feature information of the to-be-queried information, to obtain the first retrieval result includes: performing similarity comparison between the target feature information of the to-be-queried information and the target feature information of the m pieces of candidate information, to obtain the first retrieval result, where the first retrieval result includes the n pieces of candidate information with similarities greater than or equal to a first threshold in the m pieces of candidate information; and the retrieving initial feature information of the n pieces of candidate information based on the initial feature information of the to-be-queried information, to obtain the result information corresponding to the to-be-queried information includes: performing similarity comparison between the initial feature information of the to-be-queried information and the initial feature information of the n pieces of candidate information, to obtain the result information corresponding to the to-be-queried information, where the result information is information with similarity greater than or equal to a second threshold in the n pieces of candidate information.

In one embodiment, the target feature information of each piece of candidate information is obtained based on the initial feature information of the candidate information.

In one embodiment, the target feature information of the candidate information is obtained after the feature processing is performed on the initial feature information of the candidate information, the feature processing includes at least feature dimension processing, and the feature dimension processing is used to process a data dimension of the initial feature information of the to-be-queried information to be a preset dimension.

In one embodiment, the feature dimension processing includes any one of dimensionality increasing processing, dimensionality reduction processing, and dimension equivalency processing:

when the data dimension of the initial feature information of the to-be-queried information is greater than the preset dimension, the feature dimension processing is the dimensionality reduction processing;

when the data dimension of the initial feature information of the to-be-queried information is less than the preset dimension, the feature dimension processing is the dimensionality increasing processing; or when the data dimension of the initial feature information of the to-be-queried information is equal to the preset dimension, the feature dimension processing is the dimension equivalency processing.

In one embodiment, the feature processing further includes feature equalization processing, the feature equalization processing is used to perform feature equalization on first feature information, equalized first feature information is distributed according to a preset rule, and the first feature information is feature information obtained after the feature dimension processing. When the feature processing is performed on the to-be-queried information, the first feature information is feature information obtained after the feature dimension processing is performed on the initial feature information of the to-be-queried information. When the feature processing is performed on the candidate information, the first feature information may be feature information obtained after the feature dimension processing is performed on the initial feature information of the candidate information.

In one embodiment, the feature processing further includes feature quantization processing, the feature quantization processing is used to perform feature quantization on second feature information, so that storage space for quantized second feature information is less than or equal to storage space for the second feature information, and the second feature information is feature information obtained after the feature dimension processing. When the feature processing is performed on the to-be-queried information, the second feature information is feature information obtained after the feature dimension processing is performed on the initial feature information of the to-be-queried information. When the feature processing is performed on the candidate information, the second feature information is feature information obtained after the feature dimension processing is performed on the initial feature information of the candidate information.

In one embodiment, the feature processing further includes feature quantization processing, the feature quantization processing is used to perform feature quantization on third feature information, so that storage space for quantized third feature information is less than or equal to storage space for the third feature information, and the third feature information is feature information obtained after the feature equalization processing. When the feature processing is performed on the to-be-queried information, the third feature information is feature information obtained after the feature equalization processing is performed on the initial feature information of the to-be-queried information. When the feature processing is performed on the candidate information, the third feature information is feature information obtained after the feature equalization processing is performed on the initial feature information of the candidate information.

In one embodiment, the target feature information of each piece of candidate information is non-quantized feature information, each piece of candidate information further includes index information of the candidate information, the index information is quantized feature information, and the target feature information of the to-be-queried information is non-quantized feature information;

before the performing a first retrieval operation on m pieces of candidate information based on the target feature information of the to-be-queried information, the method further includes: obtaining the target feature information of the m pieces of candidate information based on index information of the m pieces of candidate information; and the first retrieval operation includes: retrieving non-quantized feature information of the m pieces of candidate information based on the non-quantized feature information of the to-be-queried information, to obtain the first retrieval result, where the first retrieval result includes the n pieces of candidate information, and n is a positive integer less than m.

In one embodiment, the target feature information of each piece of candidate information is quantized feature information, and the target feature information of the to-be-queried information is quantized feature information; and the first retrieval operation includes: retrieving quantized feature information of the m pieces of candidate information based on the quantized feature information of the to-be-queried information, to obtain the first retrieval result, where the first retrieval result includes the n pieces of candidate information, and n is a positive integer less than m.

According to a second aspect, an embodiment of this application provides a terminal device. The terminal device includes a functional unit configured to perform the method according to the first aspect.

According to a third aspect, an embodiment of this application provides another terminal device. The terminal device includes a memory and a processor coupled to the memory, where the memory is configured to store an instruction, the processor is configured to execute the instruction, and when executing the instruction, the processor performs the method according to the first aspect.

In one embodiment, the terminal device further includes a display coupled to the processor, and the display is configured to display information (which may be to-be-queried information, candidate information, result information, feature information, or the like) under control of the processor.

In one embodiment, the terminal device further includes a communications interface, the communications interface communicates with the processor, and the communications interface is configured to communicate with another device (for example, a network device) under control of the processor.

According to a fourth aspect, a computer-readable storage medium is provided. The computer-readable storage medium stores program code used for service switching processing. The program code includes an instruction used to perform the method according to the first aspect.

Compared with the prior art, in the embodiments of this application, high retrieval efficiency, convenience, and universality during image retrieval can be ensured, and information retrieval can be quickly, efficiently, and accurately implemented.

BRIEF DESCRIPTION OF DRAWINGS

To describe the technical solutions in the embodiments of this application or in the prior art more clearly, the following briefly describes the accompanying drawings for describing the embodiments or the prior art.

DESCRIPTION OF EMBODIMENTS

The following describes the technical solutions in the embodiments of this application in detail with reference to the accompanying drawings in this application.

First, some technical terms used in this application are described.

Initial feature information: Initial feature information is also referred to as depth feature information, and is feature information obtained after feature extraction is performed on specified information by using a feature extraction algorithm. Generally, the initial feature information is represented by an $n_0 \times 1$ matrix or vector, where no indicates a data dimension, and is a positive integer.

The specified information includes but is not limited to image information, text information, voice information, and the like. The feature extraction algorithm, for example, a deep learning algorithm such as a convolutional neural network, may be customized on a user side or a system side. Data dimensions of initial feature information obtained by using different feature extraction algorithms may be different.

Matching feature information: Matching feature information is information obtained after feature dimension processing (feature matching) is performed on initial feature information. Because data dimensions of initial feature information obtained by using different feature extraction algorithms are different, universality may be poor during information processing. In this case, the feature dimension processing may be performed on the initial feature information, to obtain matching feature information whose data dimension is a preset dimension. In other words, after initial feature information with different data dimensions is input, matching feature information corresponding to a same data dimension may be obtained. Details are to be described below.

Initial feature information of an image A and initial feature information of an image B are used as an example, and data dimension of the initial feature information A is greater than a data dimension of the initial feature information B. After the feature dimension processing is separately performed on the initial feature information A and the initial feature information B, matching feature information corresponding to the initial feature information A and matching feature information corresponding to the initial feature information B may be obtained, and the matching feature information of the two images has a same data dimension. How to perform the feature dimension processing is to be described below in this application. Details are not described herein.

Equalized feature information: Equalized feature information (which may be initial feature information or matching feature information) is information obtained after feature equalization processing is performed on feature information. Data of feature information obtained after feature extraction or feature matching is performed on information is unevenly distributed in various dimensions. It may be understood that information included/indicated in the dimensions differs. An amount of information included/indicated in some dimensions is relatively large, and an amount of information included/indicated in some dimensions is relatively small. In other words, features are unevenly distributed. This leads to low information processing accuracy. Therefore, in this application, the feature equalization processing may be performed on the feature information, and the equalized feature information may be subsequently used for related processing. How to implement the feature equalization processing is to be described below in this application. Details are not described herein.

Quantized feature information: Quantized feature information (which may be any one of initial feature information, matching feature information, and equalized feature information) is information obtained after feature quantization processing is performed on feature information. In a process of processing massive data, a huge amount of data occupies relatively large memory space. In this application, to implement high information processing efficiency and reduce memory space occupation, feature quantization may be performed on the feature information, and the quantized feature information may be subsequently used for related information processing. Details are not described herein but to be described below in this application.

Non-quantized feature information: Non-quantized feature information is feature information on which no feature quantization processing is performed, and may be the matching feature information or the equalized feature information.

Hash code: A hash code is a value that is re-created by mixing data by using a hash function. Information or data may be compressed into a summary by using the hash function, to reduce a data amount and fix a format of the data.

Hamming distance: A quantity of bits, in two codewords, with different values at corresponding bit positions may be referred to as a Hamming distance between the two codewords. For example, for hash codes 10101 and 00110, bits at the first bit position, the fourth bit position, and the fifth bit position from left to right are different. In this case, a Hamming distance between the two codewords is 3.

Cosine distance: A cosine distance d between two pieces of information x and y may be calculated according to the following Formula (1): The information x and the information y may be represented by using a vector.

$$d = \frac{xy}{\|x\| \times \|y\|} \qquad \text{Formula (1)}$$

Figure 1:
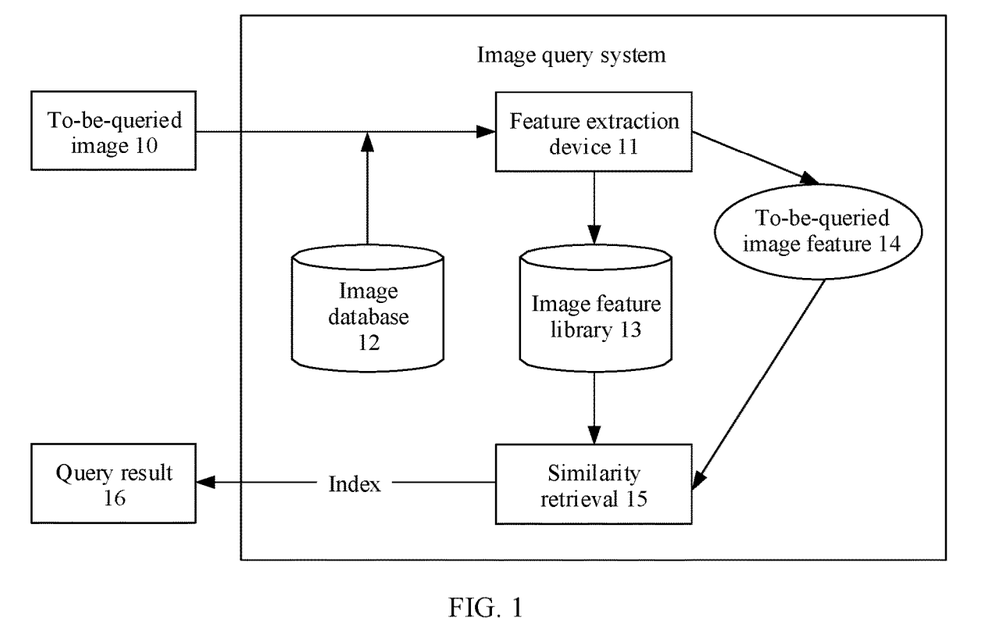
FIG. 1 is a schematic block diagram of an image query system in the prior art.

In a massive data case, how to quickly and accurately query data that is queried by a user is hot research. Image query is used as an example. FIG. 1 is a schematic block diagram of image query in the prior art.

As shown in FIG. 1, a user inputs a to-be-queried image 10 into an image query system, and a feature extraction device 11 may perform feature extraction on the to-be-queried image 10, to obtain feature information (shown as a to-be-queried image feature 14 in the figure) of the to-be-queried image. Correspondingly, an image database 12 is preconfigured in the image query system, and the image database includes a plurality of candidate images. The candidate image in the image database is input into the feature extraction device for feature extraction, to obtain a corresponding image feature library 13. The image feature library includes feature information (which may also be referred to as a candidate image feature) of each candidate image. Further, similarity retrieval 15 is performed, to find, from the image feature library, candidate image features whose similarities with the feature of the to-be-queried image are ranked in top $n_1$, and indexes (or identifiers) of the top $n_1$ candidate images are output. The top $n_1$ candidate images are used as a final query result 16, and are output and displayed to the user for viewing, where $n_1$ may be a positive integer that is customized on a user side or a system side.

In practice, it is found that the feature extraction device usually uses a deep learning network to extract feature information of an image. To ensure processing accuracy, a data dimension of the feature information is usually relatively high, and there are usually at least 256 dimensions.

There are massive images in the image database. Correspondingly, there is feature information of the massive images in the image feature library, and a relatively large memory space is occupied by the feature information of the massive images. In addition, in a similarity retrieval process, a general central processing unit CPU does not have an enough high computing capability to deal with such a huge amount of computation, and an acceleration device such as a graphics processing unit GPU is required. However, it is still difficult to ensure high image query efficiency and convenience.

In addition, the image query system has poor universality. To implement the similarity retrieval, the feature extraction device in the system supports a single feature extraction algorithm, to enable the feature information of the to-be-queried image to have a same data dimension as the feature information of the candidate image. The feature extraction device in the system does not adapt to/support a plurality of feature extraction algorithms, and data dimensions of image feature information calculated by using different feature extraction algorithms may be different. Consequently, similarity retrieval cannot be quickly implemented.

Figure 2:
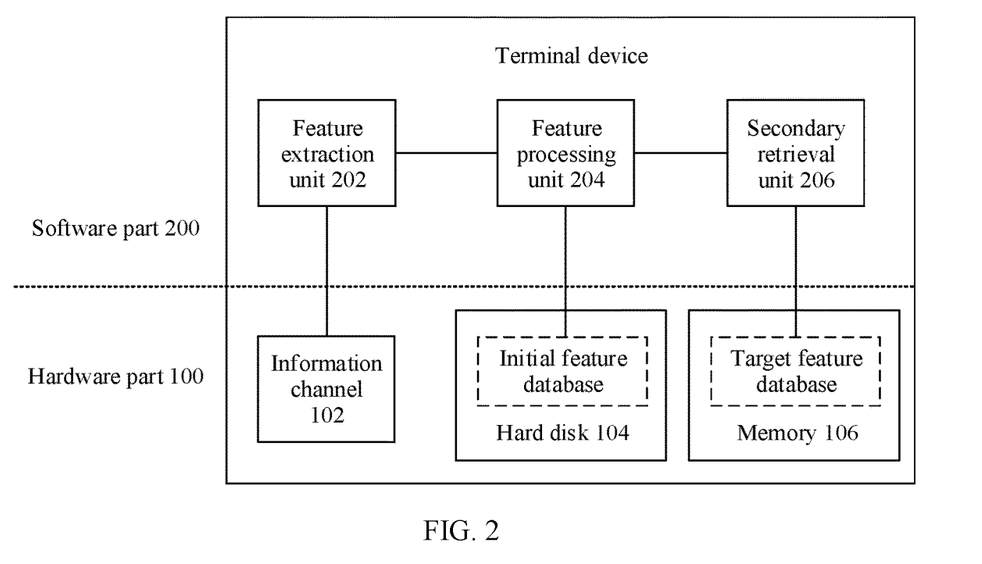
FIG. 2 is a schematic diagram of a network architecture according to an embodiment of this application.

To resolve the foregoing problem, this application provides an information processing method and a terminal device to which the method is applicable. FIG. 2 is a schematic diagram of a possible network architecture of a terminal device according to this application. As shown in FIG. 2, the schematic diagram of the network architecture includes a hardware part 100 and a software part 200. The hardware part includes an information channel 102, a hard disk (a host storage) 104, and a memory 106. The software part 200 includes a feature extraction unit 202, a feature processing unit 204, and a secondary retrieval unit 206.

The information channel 102 is configured to obtain target information (for example, to-be-queried information or candidate information). The target information may be image information, text information, voice information, or the like. This is not limited in this application. That the target information is image information is used as an example. The information channel may be a camera, or another obtaining channel or element configured to obtain the image information.

The hard disk 104 is configured to store initial feature information of the target information and/or the target information. For example, when there are a plurality of pieces of target information, initial feature information of each of the plurality of pieces of target information may be stored in an initial feature database, and stored in the hard disk of the device.

The memory 106 is configured to store target feature information of the target information, for example, quantized feature information, equalized feature information, and matching feature information of the candidate information or quantized feature information, equalized feature information, and matching feature information of the to-be-queried information. When there are a plurality of pieces of target information, target feature information of each of the plurality of pieces of target information may be stored in a target feature database, and stored in the memory of the device. This facilitates high-speed parallel computing during information retrieval and can improve information retrieval efficiency. The memory may be a graphics processing unit (GPU), a field-programmable gate array (FPGA), a dedicated chip, or the like.

The feature extraction unit 202 may be configured to perform feature extraction on the obtained target information, to obtain the initial feature information of the target information, for example, initial feature information of the to-be-queried information and initial feature information of the candidate information. In one embodiment, the feature extraction unit may store the initial feature information of the target information in the hard disk. How to implement the feature extraction on the information is to be described in detail below in this application.

The feature processing unit 204 may be configured to perform feature processing on the initial feature information of the target information, to obtain the target feature information of the target information. Further, the target feature information of the target information may be stored in the memory. The feature processing and the target feature information are to be described in detail below in this application.

The secondary retrieval unit 206 is configured to perform secondary retrieval based on the target feature information and the initial feature information of the information (which may be the candidate information or the to-be-queried information), to obtain final retrieval result information. Details about the secondary retrieval are to be described below in this application.

Figure 3:
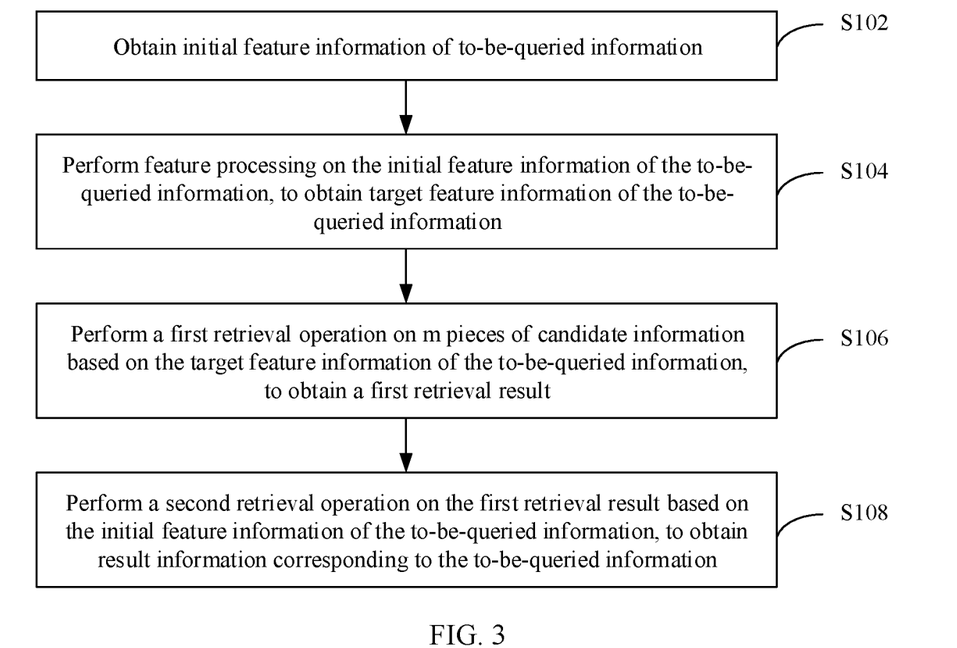
FIG. 3 is a schematic flowchart of an information processing method according to an embodiment of this application.

Based on the foregoing embodiment, FIG. 3 shows an information processing method according to an embodiment of this application. The method shown in FIG. 3 includes the following implementation operations.

Operation S102: A terminal device obtains initial feature information of to-be-queried information.

The terminal device may obtain the to-be-queried information, and a manner of obtaining the to-be-queried information is not limited. For example, the terminal device may obtain the to-be-queried information from a local database, or may obtain the to-be-queried information from another device through a network. The to-be-queried information may be image information, text information, voice information, or the like. This is not limited in this application.

Operation S104: The terminal device performs feature processing on the initial feature information of the to-be-queried information, to obtain target feature information of the to-be-queried information, where the feature processing includes at least feature dimension processing used to process a data dimension of the initial feature information of the to-be-queried information to be a preset dimension.

The feature processing may further include feature equalization processing and/or feature quantization processing. The feature equalization processing is used to perform feature equalization on feature information, so that equalized feature information is distributed according to a preset rule. The feature quantization processing is used to perform feature quantization on feature information, so that storage space (or a data dimension) for quantized feature information is less than storage space (or a data dimension) for the feature information before the quantization. The feature dimension processing, the feature equalization processing, and the feature quantization processing are to be described in detail below in this application.

Operation S106: The terminal device performs a first retrieval operation on m pieces of candidate information based on the target feature information of the to-be-queried information, to obtain a first retrieval result, where m is a positive integer.

Operation S108: The terminal device performs a second retrieval operation on the first retrieval result based on the initial feature information of the to-be-queried information, to obtain result information corresponding to the to-be-queried information.

The terminal device may perform secondary retrieval based on target feature information and initial feature information of each of the m pieces of candidate information and the target feature information and the initial feature information of the to-be-queried information, to obtain the result information corresponding to the to-be-queried information. The result information is information in the m pieces of candidate information, and the target feature information of each of the m pieces of candidate information is obtained based on the initial feature information of each of the m pieces of candidate information.

The following describes some particular embodiments and other embodiments in this application.

In operation S102, after obtaining the to-be-queried information, the terminal device may perform feature extraction on the to-be-queried information by using a feature extraction algorithm, to obtain the initial feature information of the to-be-queried information. Different vendors may use different feature extraction algorithms, and correspondingly, data dimensions of obtained initial feature information of the to-be-queried information may be different. The feature extraction algorithms are algorithms used to implement the feature extraction, for example, deep learning algorithms such as a deep residual network (resnet), a GoogLeNet convolutional neural network (GoogLeNet), a perceptron neural network (PNN), a Hopfield network, a radial basis function (RBF) neural network, and a feedback neural network.

The to-be-queried information may be image information, text information, voice information, information in another form, or the like. This is not limited in this application.

In operation S104, to adapt to information retrieval systems of the different vendors, after obtaining the initial feature information of the to-be-queried information, the terminal device may further perform the feature dimension processing on the initial feature information of the to-be-queried information, to process the data dimension of the initial feature information to be the preset dimension. In one embodiment, the feature information obtained after the feature dimension processing may be used as the target feature information. In other words, the initial feature information, extracted and obtained by the different vendors, of the to-be-queried information is processed to be initial feature information, with the preset dimension, of to-be-queried information. The preset dimension may be customized on a user side or a system side, and may be a positive integer. This is not limited in this application.

The terminal device may perform the feature dimension processing on the initial feature information of the to-be-queried information by using a pre-stored feature matching matrix, to process the data dimension of the initial feature information of the to-be-queried information to be the preset dimension. The feature matching matrix is obtained by the system side by pre-training first sample information. The first sample information may be small sample information. For example, a quantity of pieces of the first sample information is less than or equal to a preset quantity. How to train the first sample information is not described in detail in this application.

In one embodiment, the feature dimension processing includes any one of the following: dimensionality increasing processing, dimensionality reduction processing, and dimension equivalency processing. When the data dimension of the initial feature information is greater than the preset dimension, the feature dimension processing is dimensionality reduction processing. When the data dimension of the initial feature information is equal to the preset dimension, the feature dimension processing is dimension equivalency processing. When the data dimension of the initial feature information is less than the preset dimension, the feature dimension processing is dimensionality increasing processing.

When the data dimension of the initial feature information is greater than the preset dimension, the terminal device may perform the dimensionality reduction processing on the initial feature information of the to-be-queried information by using a dimensionality reduction matrix, to obtain the initial feature information, with the preset dimension, of the to-be-queried information. When the data dimension of the initial feature information is equal to the preset dimension, the terminal device may perform the dimension equivalency processing on the initial feature information of the to-be-queried information by using a dimension equivalency matrix, to obtain the initial feature information, with the preset dimension, of the to-be-queried information. When the data dimension of the initial feature information is less than the preset dimension, the terminal device may perform the dimensionality increasing processing on the initial feature information of the to-be-queried information by using a dimensionality increasing matrix, to obtain the initial feature information, with the preset dimension, of the to-be-queried information. The dimensionality increasing matrix, the dimensionality reduction matrix, and the dimension equivalency matrix may be obtained through pre-training by the terminal device.

For example, after obtaining the initial feature information of the to-be-queried information, the terminal device may compare the data dimension D of the initial feature information with the preset dimension $D_n$. If $D=D_n$, a feature matching matrix A is a dimension equivalency matrix. For example, the dimension equivalency matrix may be a constructed identity matrix I, that is, A=I. If $D>D_n$, a feature matching matrix A is a dimensionality reduction matrix. For example, in this application, small sample data may be randomly selected, and the dimensionality reduction matrix A is obtained through calculation by using a principal component analysis method. How to obtain the dimensionality reduction matrix through principal component analysis is not described in detail in this application. If $D<D_n$, a feature matching matrix A is a dimensionality increasing matrix. For example, the dimensionality increasing matrix may be constructed by using a preset feature dimensionality increasing technology. The following Formula (2) shows a possible dimensionality increasing matrix.

$$A = \begin{bmatrix} I & 0 \\ 0 & 0 \end{bmatrix} \quad \text{Formula (2)}$$

A is a D×Dn matrix (or a matrix block), I is a D×D matrix, and 0 represents a zero matrix of a corresponding dimension.

In some embodiments, the feature processing may further include feature equalization processing. The feature equalization processing is used to perform feature equalization on first feature information, so that equalized first feature information may be distributed according to a preset rule. The first feature information is feature information, obtained after the feature dimension processing, of the to-be-queried information, and may also be referred to as matching feature information in this application. In one embodiment, the feature information obtained after the feature equalization processing may be used as the target feature information.

After performing the feature dimension processing, the terminal device may further perform the feature equalization on the first feature information (which is also the matching feature information) by using a feature equalization matrix, so that the equalized first feature information (which may also be referred to as equalized feature information in this application) may be distributed according to the preset rule. The preset rule is associated with a manner/method of the feature equalization, and may be customized on the user side or the system side. For example, the terminal device may construct the feature equalization matrix by using technologies such as random projection, variance equalization, and Gaussian equalization. The Gaussian equalization is used as an example. The equalized first feature information may be Gaussian distributed.

In one embodiment, the feature equalization matrix may be obtained by the terminal device by pre-training second sample information. The second sample information may be small sample information. For details, refer to related descriptions in the foregoing embodiment. The second sample information may be the same as or different from the first sample information. How to train the second sample information to obtain the feature equalization matrix is not described in detail in this application.

For example, the terminal device may generate, by using a Gaussian distribution random sequence coding (Marsaglia polar) method, $D_n \times D_n$ random numbers that are independent of each other and that comply with standard normal distribution, and arrange the $D_n \times D_n$ random numbers as a $D_n \times D_n$ random matrix. Further, the terminal device decomposes the random matrix by using an orthogonal-triangular QR decomposition method, to obtain a random orthogonal matrix, where the random orthogonal matrix is used as a feature equalization matrix R. Further, the terminal device may obtain corresponding equalized feature information by left-multiplying the matching feature information obtained after the feature dimension processing, by the feature equalization matrix R.

In some embodiments, the feature processing may further include feature quantization processing. The feature quantization processing is used to perform feature quantization processing on second feature information, so that storage space for quantized second feature information (which may also be referred to as quantized feature information in this application) is less than or equal to storage space for the second feature information, or a data dimension of quantized second feature information is less than or equal to a data dimension of the second feature information. The second feature information is feature information (namely, the foregoing matching feature information) obtained after the feature dimension processing. Alternatively, the second feature information may be feature information (namely, the foregoing equalized feature information) obtained after the feature equalization processing. In one embodiment, the feature information obtained after the feature quantization processing may be used as the target feature information.

The terminal device may perform feature quantization on the second feature information (which may be matching feature information or equalized feature information) by using a preset feature quantization model, to obtain corresponding quantized feature information. A data dimension of the quantized feature information is definitely less than or equal to a data dimension of the feature information before the quantization. In this way, storage space in the memory can be saved. In other words, storage space for the quantized feature information is less than or equal to storage space for the feature information before the quantization. The feature quantization model may be customized on the user side or the system side, or may be obtained by the terminal device by pre-training third sample information. The third sample information may also be small sample information, and may be the same as or different from the first sample information or the second sample information. This is not limited in this application.

For example, the feature quantization model is a hash coding criterion used for quantization. The following Formula (3) provides a hash coding criterion:

$$y = \begin{cases} 0, & x < 0 \\ 1, & x \geq 0 \end{cases} \qquad \text{Formula (3)}$$

x is the second feature information, and may be a feature value in the feature information in each dimension. y is the quantized second feature information. That the second feature information is 8-dimensional feature information is used as an example. The second feature information is x=(−0.1, 0.2, 0.5, −1, 1.7, 0.8, −0.9, 0.4). Correspondingly, y=(0, 1, 1, 0, 1, 1, 0, 1) is obtained after the quantization is performed according to the foregoing hash coding criterion.

In some embodiments, the feature processing in this application may be encapsulated as a feature processing model. In other words, the initial feature information of the to-be-queried information is input into the feature processing model, and corresponding feature processing is performed, to obtain the target feature information of the to-be-queried information. The feature processing model includes at least feature dimension processing. In one embodiment, the feature processing model may further include operations such as feature equalization processing and feature quantization processing. For details, refer to related descriptions in the foregoing embodiment. Details are not described herein again.

Operation S106 and operation S108 are implementation operations of performing secondary retrieval by the terminal device to obtain the result information corresponding to the to-be-queried information. The following describes related embodiments used in S106 and S108.

In operation S106, the terminal device retrieves the target feature information of each of them pieces of candidate information based on the target feature information of the to-be-queried information, to obtain the first retrieval result, where the first retrieval result includes n pieces of candidate information, and n is a positive integer less than m. Further, in S108, the terminal device may retrieve initial feature information of each of the n pieces of candidate information in the first retrieval result based on the initial feature information of the to-be-queried information, to obtain the result information corresponding to the to-be-queried information.

A data dimension of the target feature information of the to-be-queried information is the same as a data dimension of target feature information of each piece of candidate information. The m pieces of candidate information may be information pre-stored in an information database. The target feature information of each of the m pieces of candidate information is obtained based on the initial feature information of each of the m pieces of candidate information. Details are to be described below in this application.

The target feature information of each of the m pieces of candidate information may be feature information pre-stored in an information feature database, the initial feature information of the candidate information one-to-one corresponds to the target feature information of the candidate information, and the initial feature information of the candidate information and the target feature information of the candidate information may be distinguished by using an identifier/index of the same candidate information. Details are not described in this application.

The terminal device may first perform similarity comparison between the target feature information of each of the m pieces of candidate information and the target feature information of the to-be-queried information, to obtain the n pieces of candidate information. The n pieces of candidate information are information with a similarity greater than or equal to a first threshold in the m pieces of candidate information. In one embodiment, n and m are positively correlated with each other, and both are positive integers. Further, the terminal device may perform similarity comparison between the initial feature information of each of then pieces of candidate information and the initial feature information of the to-be-queried information, to obtain the corresponding result information. The result information is information with similarity greater than or equal to a second threshold in the n pieces of candidate information. Both the first threshold and the second threshold are customized on the user side or the system side. The first threshold may be the same as or different from the second threshold. This is not limited in this application.

The similarity comparison may be implemented in a plurality of manners. For example, a similarity may be calculated in a manner such as using a Hamming distance, a cosine distance, or a Euclidean distance, and the similarity comparison is further implemented. For example, a similarity is calculated by using a Hamming distance and a cosine distance. When the target feature information is obtained after the quantization is performed according to the hash coding criterion, the terminal device may calculate a Hamming distance H between the target feature information of each of the m pieces of candidate information and the target feature information of the to-be-queried information based on the target feature information of each of the m pieces of candidate information, further arrange obtained m Hamming distances in ascending order, and select indexes of candidate information corresponding to top n Hamming distances as indexes of the n pieces of candidate information, where n is in direct proportion to m, and is less than or equal to m.

Further, the terminal device obtains the initial feature information of each of the n pieces of candidate information based on the indexes of the n pieces of candidate information. Further, the terminal device calculates a cosine distance between the initial feature information of each of the n pieces of candidate information and the initial feature information of the to-be-queried information based on the initial feature information of each of the n pieces of candidate information, further arranges obtained n cosine distances in descending order, and selects indexes of candidate information corresponding to top k cosine distances as indexes of the result information. Further, the terminal device obtains k pieces of result information corresponding to the indexes, from the information database based on the indexes of the obtained k pieces of result information. In one embodiment, the k pieces of result information may be displayed to the user for viewing, where k is in direct proportion to n (or m). In addition, k is less than or equal to n, and is far less than m, and k is a positive integer.

In actual application, this application may support concurrent retrieval of a plurality of pieces of information. Secondary retrieval can be performed to implement information retrieval more accurately. The initial feature information in this application may be stored in an initial feature database, and may be stored in a hard disk of the terminal device. The target feature information (which may be matching feature information, equalized feature information, or quantized feature information) in this application may be stored in a target feature database, and may be stored in a memory, for example, a graphics processing unit GPU, a central processing unit CPU, or a dedicated chip, of the terminal device. This can avoid input/output I/O of a large amount of data during information retrieval, help improve information retrieval efficiency, and help reduce information retrieval response time.

In some embodiments, the following describes several possible implementations of operation S106.

In some embodiments, both the target feature information of the candidate information and the target feature information of the to-be-queried information are matching feature information. In this case, an embodiment of S106 is as follows: The terminal device may perform similarity comparison between matching feature information of the to-be-queried information and matching feature information of each of the m pieces of candidate information, to obtain the first retrieval result including the n pieces of candidate information.

The implementation of performing similarity comparison herein may be implemented in a manner such as calculating a cosine distance and a Euclidean distance between the matching feature information of the two types of information. Details are not described in this application.

In still some other embodiments, both the target feature information of the candidate information and the target feature information of the to-be-queried information are quantized feature information. In this case, one embodiment of S106 is as follows: The terminal device may perform similarity comparison between quantized feature information of the to-be-queried information and quantized feature information of each of the m pieces of quantized feature information, to obtain the first retrieval result including the n pieces of candidate information. The implementation of performing similarity comparison herein may be implemented in a manner such as calculating a Hamming distance and a cosine distance between the quantized feature information of the two types of information. Details are not described herein.

In one embodiment, the candidate information further includes index information, and the index information is quantized feature information. The target feature information of the candidate information is non-quantized feature information, and the target feature information of the to-be-queried information is non-quantized feature information. In this case, before operation S106, the terminal device may obtain non-quantized feature information of each of the m pieces of candidate information based on index information of each of the m pieces of candidate information. Correspondingly, one embodiment of S106 is as follows: The terminal device may perform similarity comparison between the non-quantized feature information of the to-be-queried information and the non-quantized feature information of each of the m pieces of to-be-queried information, to obtain the first retrieval result including the n pieces of candidate information. For the similarity comparison, refer to related descriptions in the foregoing implementations. Details are not described herein again.

The quantized feature information (the index information) of the candidate information may be feature information pre-stored in an information feature database. The terminal device may obtain the non-quantized feature information of the candidate information based on a preset mapping table and the quantized feature information of the candidate information. The preset mapping table is customized on the user side or the system side. The preset mapping table stores at least a mapping relationship between the quantized feature information (namely, the index information) of the candidate information and the non-quantized feature information (namely, the target feature information) of the candidate information. In actual application, to save a memory resource and improve information processing efficiency of the terminal device, the preset mapping table may be pre-stored in the hard disk of the terminal device, or may be stored in another device (namely, a server). The preset mapping table is read/obtained when the preset mapping table needs to be used.

There are the following two particular implementations:

In a first implementation, the non-quantized feature information of the to-be-queried information is matching feature information, the index information of the candidate information is quantized feature information, and the non-quantized feature information of the candidate information is matching feature information. Correspondingly, before S106, the terminal device may obtain matching feature information of each of the m pieces of candidate information based on the preset mapping table and the quantized feature information of each of the m pieces of candidate information. Further, in S106, the terminal device may perform similarity comparison based on the matching feature information of the to-be-queried information and the matching feature information of each of the m pieces of candidate information, to obtain the first retrieval result including the n pieces of candidate information. The preset mapping table stores at least a mapping/an association relationship between the quantized feature information and the matching feature information corresponding to each of the m pieces of candidate information, where the quantized feature information one-to-one corresponds to the matching feature information of each piece of the candidate information. Details are not described in this application.

In a second implementation, the non-quantized feature information of the to-be-queried information is equalized feature information, the index information of the candidate information is quantized feature information, and the non-quantized feature information of the candidate information is equalized feature information. Correspondingly, before S106, the terminal device may obtain equalized feature information of each of the m pieces of candidate information based on the preset mapping table and the quantized feature information of each of the m pieces of candidate information. Further, in S106, the terminal device may perform similarity comparison based on the equalized feature information of the to-be-queried information and the equalized feature information of each of the m pieces of candidate information, to obtain the first retrieval result including the n pieces of candidate information. The preset mapping table stores at least a mapping/an association relationship between the quantized feature information and the equalized feature information corresponding to each of the m pieces of candidate information, where the quantized feature information of each piece of the candidate information one-to-one corresponds to the equalized feature information of each piece of the candidate information. Details are not described in this application.

In some embodiments, before S106, the terminal device may further obtain the target feature information of each of the m pieces of candidate information. The target feature information of each of the m pieces of candidate information may be obtained by a first device (which may be the terminal device or another device) based on the initial feature information of each of the m pieces of candidate information. In one embodiment, after the target feature information of each of the m pieces of candidate information is obtained, the target feature information may be pre-stored in the information feature database, so that the target feature information is obtained when operation S106 is performed.

Figure 4:
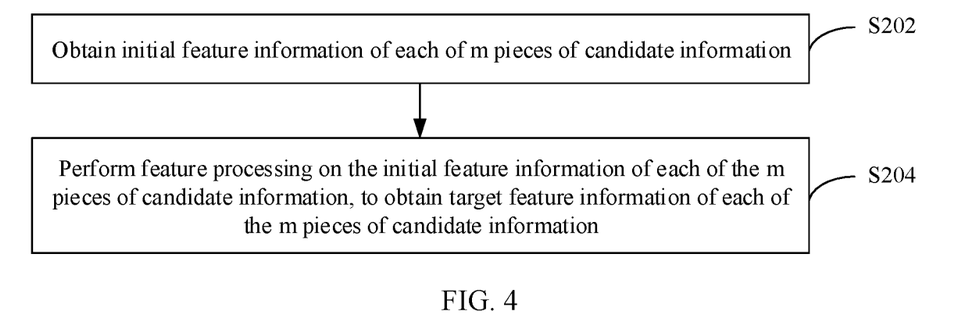
FIG. 4 is a schematic flowchart of another information processing method according to an embodiment of this application.

The following provides a description by using an example in which the terminal device obtains, through processing, the target feature information of each of the m pieces of candidate information. FIG. 4 is a schematic flowchart of another information processing method. The method shown in FIG. 4 may include the following implementation operations:

Operation S202: A terminal device obtains initial feature information of each of m pieces of candidate information.

Operation S204: The terminal device performs feature processing on the initial feature information of each of the m pieces of candidate information, to obtain target feature information of each of the m pieces of candidate information.

In operation S202, the terminal device may first obtain the m pieces of candidate information, and then perform feature extraction on the m pieces of candidate information, to obtain the initial feature information of each of the m pieces of candidate information. The m pieces of candidate information may be information in a preset information database, and the information may be image information, text information, voice information, or the like. This is not limited in this application. The m pieces of candidate information are obtained in a plurality of manners of obtaining, for example, obtained from a local database or obtained from another device through a network. Details are not described in this application.

In operation S204, when the feature processing is performed on initial feature information of any piece of candidate information in the m pieces of candidate information, the feature processing may include at least feature dimension processing, and the feature dimension processing is used to process a data dimension of the initial feature information of the any piece of candidate information to be a preset dimension. In one embodiment, the feature processing may further include feature equalization processing and/or feature quantization processing. For details about the feature processing, refer to related descriptions in the foregoing embodiments. Details are not described herein again.

In actual application, feature processing performed on initial feature information of to-be-queried information may be the same as or different from the feature processing performed on the initial feature information of the any piece of candidate information, and both the feature processing may be configured on a user side or a system side. Corresponding feature processing may be performed on the initial feature information of the to-be-queried information by using a first feature processing model, and corresponding feature processing may be performed on the initial feature information of the any piece of candidate information by using a second feature processing model. The feature processing set for the first feature model may be the same as or different from the feature processing set for the second feature model.

For example, the first feature processing model includes feature dimension processing and feature equalization processing, and the second feature processing model includes feature dimension processing, feature equalization processing, and feature quantization processing. After the initial feature information of the to-be-queried information is input into the first feature processing model, the feature dimension processing and the feature equalization processing may be sequentially performed on the initial feature information of the to-be-queried information, to obtain target feature information of the to-be-queried information. In other words, in this case, the target feature information of the to-be-queried information is feature information obtained after the feature dimension processing and the feature equalization processing are sequentially performed on the initial feature information of the to-be-queried information. Correspondingly, target feature information of the any piece of candidate information in the m pieces of candidate information may be feature information obtained after the initial feature information of the any piece of candidate information is input into the second feature processing model and the feature dimension processing, the feature equalization processing, and the feature quantization processing are sequentially performed on the initial feature information of the any piece of candidate information. Details are not described in this application.

Compared with the prior art, in the embodiments of this application, high retrieval efficiency, convenience, and universality during image retrieval can be ensured, and information retrieval can be quickly, efficiently, and accurately implemented.

The foregoing mainly describes, from a perspective of the terminal device, the solutions provided in the embodiments of this application. It may be understood that, to implement the foregoing functions, the terminal device includes corresponding hardware structures and/or software modules for performing the functions. With reference to the units and algorithm operations described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the field may use different methods to implement the described functions for each particular application.

In the embodiments of this application, the terminal device may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in the embodiments of this application, division into units is an example, is merely logical function division, and may be other division in an actual implementation.

Figure 5A:
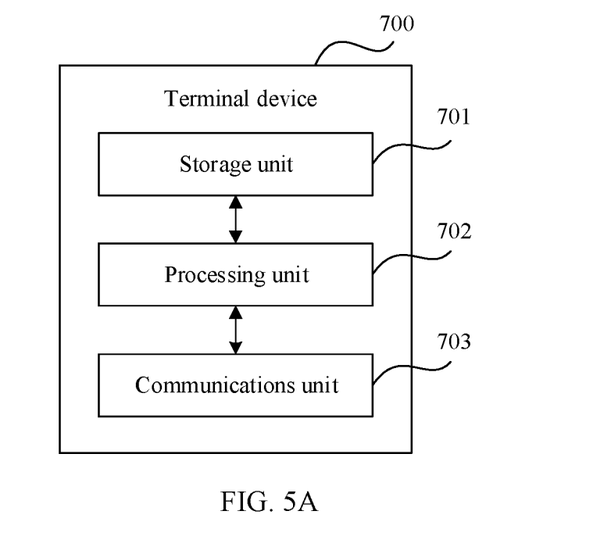
FIG. 5A and FIG. 5B are schematic structural diagrams of two terminal devices according to embodiments of this application.

When the integrated unit is used, FIG. 5A is a possible schematic structural diagram of the terminal device in the foregoing embodiments. The terminal device 700 includes a processing unit 702 and a communications unit 703. The processing unit 702 is configured to control and manage an action of the terminal device 700. For example, the processing unit 702 is configured to support the terminal device 700 in performing operations S104 to S108 in FIG. 3, operation S204 in FIG. 4, and/or another operation of the technology described in this specification. The communications unit 703 is configured to support the terminal device 700 in communicating with another device. For example, the communications unit 703 is configured to support the terminal device 700 in performing operation S102 in FIG. 3, operation S202 in FIG. 4, and/or another operation of the technology described in this specification. In one embodiment, the terminal device 700 may further include a storage unit 701.

The storage unit 701 is configured to store program code and data of the terminal device 700.

The processing unit 702 may be a processor or a controller, such as a central processing unit (CPU), a general-purpose processor, a digital signal processor (DSP), an application-specific integrated circuit (ASIC), a graphics processing unit (GPU), a field programmable gate array (FPGA) or another programmable logic device, a transistor logic device, a hardware component, or any combination thereof. The processing unit 702 may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications unit 703 may be a communications interface, a transceiver, a transceiver circuit, or the like. The communications interface is a collective term, and may include one or more interfaces, for example, an interface between the terminal device and another device. The storage unit 701 may be a memory.

In one embodiment, the terminal device 700 may further include a display unit (not shown in the figure). The display unit may be configured to preview or display information. For example, the display unit is configured to display to-be-queried information, result information, and candidate information. In actual application, the display unit may be a display, a player, or the like. This is not limited in this application.

In one embodiment, when the information in this application is image information, the terminal device 700 may further include a photographing unit. The photographing unit may be configured to obtain, through photographing, the to-be-queried information, the candidate information, and the like. In actual application, the photographing unit may be a photographing module, a camera, or the like. This is not limited in this application.

In one embodiment, when the information in this application is voice information, the terminal device 700 may further include an audio element such as an earpiece or a microphone. The audio element may be configured to collect voice information (namely, the to-be-queried information, the candidate information, or the like) input by a user. Details are not described in this application.

Figure 5B:
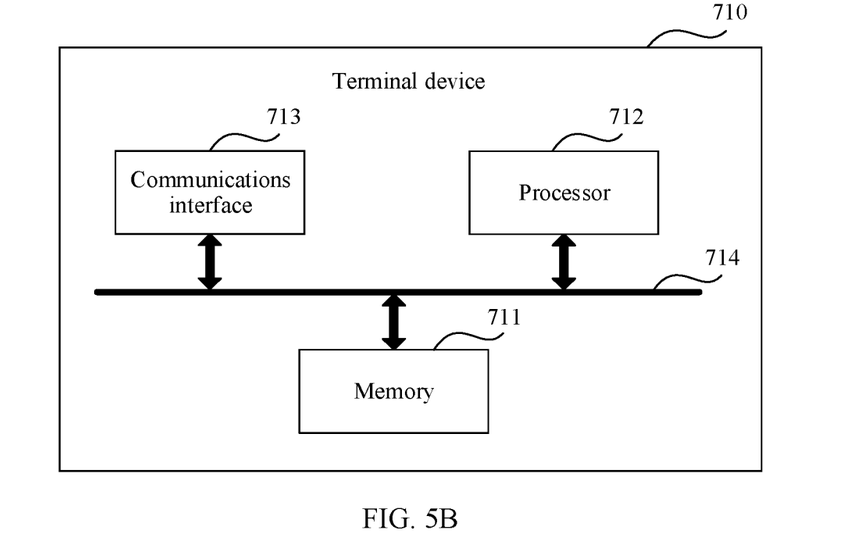

When the processing unit 702 is a processor, the communications unit 703 is a communications interface, and the storage unit 701 is a memory, the terminal device in the embodiments of this application may be a terminal device shown in FIG. 5B.

As shown in FIG. 5B, the terminal device 710 includes a processor 712, a communications interface 713, and a memory 711. In one embodiment, the terminal device 710 may further include a bus 714. The communications interface 713, the processor 712, and the memory 711 may be connected to each other by using the bus 714. The bus 714 may be a peripheral component interconnect (PCI) bus, an extended industry standard architecture (EISA) bus, or the like. The bus 714 may be classified into an address bus, a data bus, a control bus, and the like. For ease of representation, only one thick line is used to represent the bus in FIG. 5B, but this does not mean that there is only one bus or only one type of bus.

For one implementation of the terminal device shown in FIG. 5A or FIG. 5B, refer to corresponding descriptions in the foregoing method embodiments. Details are not described herein.

Methods or algorithm operations described in combination with the content disclosed in the embodiments of this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in the terminal device. Certainly, the processor and the storage medium may exist in the terminal device as separate components.

A person of ordinary skill in the art may understand that all or some of the processes of the methods in the embodiments may be implemented by a computer program instructing relevant hardware. The program may be stored in a computer-readable storage medium. When the program is run, the processes of the methods in the embodiments are performed. The foregoing storage medium includes any medium that can store program code, such as a ROM, a RAM, a magnetic disk, or an optical disc.

What is claimed is:

1. An information processing method for use by a terminal device including a processor comprising:
    obtaining by the processor initial feature information of to-be-queried information;
    performing by the processor feature processing on the initial feature information of the to-be-queried information to obtain target feature information of the to-be-queried information, wherein the feature processing comprises at least feature dimension processing, and the feature dimension processing is used to process a data dimension of the initial feature information of the to-be-queried information to be a preset dimension, wherein the feature processing further comprises feature quantization processing, the feature quantization processing is used to perform feature quantization on second feature information, wherein the second feature information is feature information obtained after the feature dimension processing is performed on the initial feature information of the to-be-queried information and the target feature information of the to-be-queried information is quantized feature information;
    performing by the processor a first retrieval operation on m pieces of candidate information based on the target feature information of the to-be-queried information to obtain a first retrieval result, wherein m is a positive integer; and
    performing by the processor a second retrieval operation on the first retrieval result based on the initial feature information of the to-be-queried information to obtain result information corresponding to the to-be-queried information.

2. The method according to claim 1, wherein each piece of candidate information comprises initial feature information of the candidate information and target feature information of the candidate information, and a data dimension of the target feature information of the candidate information is the same as a data dimension of the target feature information of the to-be-queried information;
    wherein, the first retrieval operation comprises:
    retrieving target feature information of the m pieces of candidate information based on the target feature information of the to-be-queried information to obtain the first retrieval result, wherein the first retrieval result comprises n pieces of candidate information, and n is a positive integer less than m; and
    the second retrieval operation comprises:
    retrieving initial feature information of the n pieces of candidate information based on the initial feature information of the to-be-queried information to obtain the result information corresponding to the to-be-queried information.

3. The method according to claim 1, wherein the feature processing further comprises feature equalization processing, the feature equalization processing is used to perform feature equalization on first feature information, equalized first feature information is distributed according to a preset rule, and the first feature information is feature information obtained after the feature dimension processing is performed on the initial feature information of the to-be-queried information.

4. The method according to claim 3, wherein the feature processing further comprises feature quantization processing, the feature quantization processing is used to perform feature quantization on third feature information, wherein the third feature information is feature information obtained after the feature equalization processing is performed on the initial feature information of the to-be-queried information.

5. The method according to claim 1, wherein the target feature information of each piece of candidate information is non-quantized feature information, each piece of candidate information further comprises index information of the candidate information, and the index information is quantized feature information; and
    before the performing a first retrieval operation on m pieces of candidate information based on the target feature information of the to-be-queried information, the method further comprises:
    obtaining the target feature information of the m pieces of candidate information based on index information of the m pieces of candidate information.

6. A terminal device comprising:
    at least one processor, and a memory storing instructions, which when executed by the at least one processor, cause the at least one processor to perform operations comprising:
    obtaining initial feature information of to-be-queried information;
    performing feature processing on the initial feature information of the to-be-queried information to obtain target feature information of the to-be-queried information, wherein the feature processing comprises at least feature dimension processing, and the feature dimension processing is used to process a data dimension of the initial feature information of the to-be-queried information to be a preset dimension, wherein the feature processing further comprises feature quantization processing, the feature quantization processing is used to perform feature quantization on second feature information, wherein the second feature information is feature information obtained after the feature dimension processing is performed on the initial feature information of the to-be-queried information and the target feature information of the to-be-queried information is quantized feature information;

performing a first retrieval operation on m pieces of candidate information based on the target feature information of the to-be-queried information to obtain a first retrieval result, wherein m is a positive integer; and performing a second retrieval operation on the first retrieval result based on the initial feature information of the to-be-queried information to obtain result information corresponding to the to-be-queried information.

7. The terminal device according to claim 6, wherein each piece of candidate information comprises initial feature information of the candidate information and target feature information of the candidate information, and a data dimension of the target feature information of the candidate information is the same as a data dimension of the target feature information of the to-be-queried information;

wherein, the first retrieval operation comprises:
retrieving target feature information of the m pieces of candidate information based on the target feature information of the to-be-queried information to obtain the first retrieval result, wherein the first retrieval result comprises n pieces of candidate information, and n is a positive integer less than m; and the second retrieval operation comprises:
retrieving initial feature information of the n pieces of candidate information based on the initial feature information of the to-be-queried information to obtain the result information corresponding to the to-be-queried information.

8. The terminal device according to claim 6, wherein the feature processing further comprises feature equalization processing, the feature equalization processing is used to perform feature equalization on first feature information, equalized first feature information is distributed according to a preset rule, and the first feature information is feature information obtained after the feature dimension processing is performed on the initial feature information of the to-be-queried information.

9. The terminal device according to claim 8, wherein the feature processing further comprises feature quantization processing, the feature quantization processing is used to perform feature quantization on third feature information, wherein the third feature information is feature information obtained after the feature equalization processing is performed on the initial feature information of the to-be-queried information.

10. The terminal device according to claim 6, wherein the target feature information of each piece of candidate information is non-quantized feature information, each piece of candidate information further comprises index information of the candidate information, and the index information is quantized feature information; and before the performing a first retrieval operation on m pieces of candidate information based on the target feature information of the to-be-queried information, further comprising:
obtaining the target feature information of the m pieces of candidate information based on index information of the m pieces of candidate information.

11. The terminal device according to claim 6, further comprising a display coupled to the processor, wherein the display is configured to display information under control of the processor.

12. A non-transitory computer-readable storage medium, wherein the non-transitory computer-readable storage medium stores a computer program, which when executed by a processor, causes the processor to perform operations, the operations comprising:

obtaining initial feature information of to-be-queried information;

performing feature processing on the initial feature information of the to-be-queried information to obtain target feature information of the to-be-queried information, wherein the feature processing comprises at least feature dimension processing, and the feature dimension processing is used to process a data dimension of the initial feature information of the to-be-queried information to be a preset dimension, wherein the feature processing further comprises feature quantization processing, the feature quantization processing is used to perform feature quantization on second feature information, wherein the second feature information is feature information obtained after the feature dimension processing is performed on the initial feature information of the to-be-queried information and the target feature information of the to-be-queried information is quantized feature information;

performing a first retrieval operation on m pieces of candidate information based on the target feature information of the to-be-queried information to obtain a first retrieval result, wherein m is a positive integer; and performing a second retrieval operation on the first retrieval result based on the initial feature information of the to-be-queried information to obtain result information corresponding to the to-be-queried information.

13. The non-transitory computer-readable medium according to claim 12, wherein each piece of candidate information comprises initial feature information of the candidate information and target feature information of the candidate information, and a data dimension of the target feature information of the candidate information is the same as a data dimension of the target feature information of the to-be-queried information;

wherein, the first retrieval operation comprises:
retrieving target feature information of the m pieces of candidate information based on the target feature information of the to-be-queried information to obtain the first retrieval result, wherein the first retrieval result comprises n pieces of candidate information, and n is a positive integer less than m; and the second retrieval operation comprises:
retrieving initial feature information of the n pieces of candidate information based on the initial feature information of the to-be-queried information to obtain the result information corresponding to the to-be-queried information.

14. The non-transitory computer-readable medium according to claim 12, wherein the feature processing further comprises feature equalization processing, the feature equalization processing is used to perform feature equalization on first feature information, equalized first feature information is distributed according to a preset rule, and the first feature information is feature information obtained after the feature dimension processing is performed on the initial feature information of the to-be-queried information.

15. The non-transitory computer-readable medium according to claim 14, wherein the feature processing further comprises feature quantization processing, the feature quantization processing is used to perform feature quantization on third feature information, wherein the third feature information is feature information obtained after the feature equalization processing is performed on the initial feature information of the to-be-queried information.

\* \* \* \* \*